United States Patent
Lazzara et al.

(10) Patent No.: US 11,830,231 B2
(45) Date of Patent: Nov. 28, 2023

(54) METHOD TO ACCESS A MULTIMEDIA CONTENT

(71) Applicant: Origami Lab Srl, Cervia (IT)

(72) Inventors: Daniele Lazzara, Cervia (IT); Enrico Minotti, Cervia (IT); Manolo Martini, Incisa Valdarno (IT)

(73) Assignee: Origami Lab Srl, Cervia (IT)

( * ) Notice: Subject to any disclaimer, the term of this patent is extended or adjusted under 35 U.S.C. 154(b) by 953 days.

(21) Appl. No.: 16/345,875

(22) PCT Filed: Oct. 16, 2017

(86) PCT No.: PCT/IB2017/056401
§ 371 (c)(1),
(2) Date: Apr. 29, 2019

(87) PCT Pub. No.: WO2018/083560
PCT Pub. Date: May 11, 2018

(65) Prior Publication Data
US 2021/0279463 A1 Sep. 9, 2021

(30) Foreign Application Priority Data
Nov. 4, 2016 (IT) .......................... 102016000111398

(51) Int. Cl.
*G06V 10/00* (2022.01)
*G06V 10/22* (2022.01)
*G06F 21/36* (2013.01)
*G06K 19/06* (2006.01)
*G06V 20/80* (2022.01)
*G06V 10/44* (2022.01)
*G06V 20/00* (2022.01)

(52) U.S. Cl.
CPC .............. *G06V 10/22* (2022.01); *G06F 21/36* (2013.01); *G06K 19/06037* (2013.01); *G06V 10/457* (2022.01); *G06V 20/80* (2022.01); *G06V 20/95* (2022.01)

(58) Field of Classification Search
CPC ...... G06V 20/80; G06V 10/457; G06V 20/95; G06V 10/22; G06F 21/36; G06K 19/06037; G06K 7/1417; G06Q 20/3274; G06Q 20/3276
See application file for complete search history.

(56) References Cited

U.S. PATENT DOCUMENTS

| | | | |
|---|---|---|---|
| 7,158,689 B2 | 1/2007 | Valleriano | |
| 7,876,352 B2 | 1/2011 | Martin | |
| 9,811,919 B2 | 11/2017 | Hefetz | |
| 2007/0187508 A1* | 8/2007 | Takayama | G06K 19/06037 235/432 |

(Continued)

*Primary Examiner* — Emily C Terrell
*Assistant Examiner* — Ahmed A Nasher
(74) *Attorney, Agent, or Firm* — Leason Ellis LLP

(57) ABSTRACT

The present invention relates to a method to access a. multimedia content (1400), comprising the following steps; creating (2610) a graphic code (1100, 3100, 4100), creating (2620) an account associated with the graphic code (1100, 3100, 4100), recognizing (2640) the graphic code (1100, 3100, 4100) in the multimedia content (1400), allowing (2650, 2660) a user (1000), enabled to access said account, to access the multimedia content (1400) comprising the graphic code (1100, 3100, 4100).

10 Claims, 2 Drawing Sheets

(56) References Cited

U.S. PATENT DOCUMENTS

| | | | |
|---|---|---|---|
| 2010/0230946 A1* | 9/2010 | Kanda | B42D 15/0093 |
| | | | 347/102 |
| 2013/0166418 A1 | 6/2013 | Wolf | |
| 2014/0002663 A1 | 1/2014 | Garland | |
| 2014/0040045 A1 | 2/2014 | Webb | |
| 2016/0232685 A1* | 8/2016 | Hefetz | G06T 7/90 |

* cited by examiner

METHOD TO ACCESS A MULTIMEDIA CONTENT

The present invention relates to a method and a device for accessing multimedia content, for example an image or a video. In more detail, the invention allows the user of a multimedia content realized by a third person/author, to access the multimedia content ensuring the protection of the user's privacy and, if desired, the author's privacy too. In some embodiments, the invention can be usefully applied in the case the user takes part in sport events/competitions.

BACKGROUND TO THE INVENTION

There are many events where more people are photographed by "third" photographers without a direct contact between photographed people and photographers. It is the case, for example, of sport competitions, where the athletes, passing at a given point, may be photographed by a photographer standing at that point, wherein athletes and photographer do not know each other.

In this case, usually the photographer, to sell the pictures taken during the event, upload them on a specific website. The problem is that this solution does not safeguard the privacy of the athletes who do not want their pictures published online. In some cases, the pictures are associated with the athlete's bib. But in this case again everybody can search for the pictures; in fact, it is only necessary to type a bib number, even at random. Moreover, in an event/competition bibs often have consecutive numbers, and the access to all pictures can be therefore easily automated. Moreover, the bib number is not a unique code assigned to a specific competition; therefore, it does not inform of the competition to which it refers.

In other cases, the pictures taken by the photographer are printed and then sent to the athlete's address, together with a payment form. So that the athlete can buy them. In this way, the public cannot access the athletes' pictures. However, the process of associating pictures and athletes and of mail delivering requires relatively long time; moreover, the photographer shall know the identity—or at least the address—of the single athletes, which is not always in compliance with the athletes' privacy protection. In this case, the purchase emotional component gets lost over the time. In addition, the mail order is a complication for the athlete, and this further reduces the interest in buying the pictures, with a disadvantage for both the athlete and the photographer.

Similar situations occur in all cases when a plurality of subjects can be photographed by one or more photographer who are not in direct contact with the subjects, for example in case of events at school theatres or fun parks, of company's parties etcetera.

In these cases it would be useful to have available a system allowing one or more photographer to take pictures of the subjects, and the specific subject to access his/her pictures in a simple and effective way, preventing other people from accessing his/her pictures, so as to protect the subject's privacy.

In the patent documents EP 2 677 520 A1and US 2016/0232684 A1, prior art methods are disclosed for recognizing subjects in events, to which a plurality of subjects take part. In EP 2677520 A1 the code used to this end is an RFID code, while in US 2016/02.32684 A1 the code is a graphic code. In both cases, it is an "alias" of the person carrying the code, i.e., in the case of a sport competition, a pseudonymization of the athlete's bib number; more in general, it has a logical connection with the athlete (for example because the association between RFID code/graphic code and athlete is stored in a database).

This implies that, in both cases, there is a row in a database connecting the athlete with the assigned code. In case two bibs (or RFID) are accidentally exchanged, the respective pictures will be exchanged, with a consequent mess and a disservice for the users.

SUMMARY OF THE INVENTION

The above mentioned problems are solved by the finding according to the independent claim 1.

Some embodiments of the invention refer to a method for accessing a multimedia content, comprising the steps of: creating a graphic code, creating an account associated with the graphic code, recognizing the graphic code in the multimedia content, allowing a user, enabled to access the account, to access the multimedia content containing the graphic code.

In this way, only the user, controlling the account associated with the graphic code, can advantageously access the multimedia content containing the graphic code. Thus, the user's privacy is protected. Moreover, a photographer shall not worry about how to recognize i.e. Identify an athlete, as recognition is automatic, based on the graphic code.

In some embodiments, the multimedia content is an image or a video.

In this way it is advantageously possible to recognize the graphic code by processing the image(s).

In some embodiments, the graphic code comprises a first graphic code, preferably rectangular, more preferably essentially square in shape, representing a numerical value according to a given convention.

In this way it is advantageously possible to use a code that can be recognized also in images where the code is only a small part of the whole image.

In some embodiments, the graphic code comprises a second graphic code, preferably rectangular, more preferably essentially square in shape, representing a numerical value according to a given convention.

In this way it is advantageously possible to increase the number of numerical values, and therefore the number of users that can simultaneously use the system. This is particularly useful in case, for example, of sport competitions to which many people take part, such as marathons or the like.

In some embodiments, the first graphic code and/or the second graphic code are ArUco codes.

Advantageously, in this way it is possible to exploit the advantages of the ArUco code, among which the decoding process robustness, especially in the case the graphic code constitutes only a small part of the whole image to be analyzed.

In some embodiments, the first graphic code and the second graphic code are spaced from each other by a given distance, and, if the distance is lower than a given threshold, in the recognizing step the first graphic code and the second graphic code are considered belong to a single graphic code.

In this way it is advantageously possible to couple the first code and the second code, belonging to a single code, also in images where there are more than one first and/or more than one second code, for examples pictures or videos of sport competitions with many participants.

In some embodiments, the given threshold is obtained by multiplying, by a given value, the dimension of a given side of the first graphic code or of the second graphic code.

In this way it is advantageously possible to calculate the given distance value based on the measure of the graphic code in the multimedia content. This allows easily to balance any change in the absolute dimension of the graphic code inside the multimedia content, due, for example, to different shooting distances between the photographer and the subject.

In some embodiments, the distance is calculated based on the distance between a pivot point of the first graphic code and a pivot point of the second graphic code.

In this way it is advantageously possible to calculate the distance in a reliable and simple manner. In particular, the exact position of the pivot point of the graphic code is one of the pieces of information that can be obtained by decoding the code. Once the Cartesian position of more pivot point has been obtained, it is simple to calculate the distance.

In some embodiments, the orientation of the first graphic code and/or of the second graphic code is determined by the position of the first graphic code relative to the second graphic code.

In this way it is advantageously possible to confirm, as a double control, that the orientation of a given graphic code, obtained by coding it, corresponds to the orientation it should have with respect to the other graphic code.

In some embodiments, the step of recognizing the graphic code comprises a step of decoding the graphic code, wherein the decoding step may be preceded by a step of: applying a black and white filter, and/or applying an adaptable level filter, and/or recognizing contours and/or recognizing polygons, wherein the decoding step may be followed by a step of: correcting mistakes.

In this way it is advantageously possible to decode the graphic code inside the multimedia content in a reliable way.

BRIEF DESCRIPTION OF DRAWINGS

Further characteristics and advantages of the invention will be more apparent from the description below, set forth with reference to the attached drawings, that illustrate some examples of embodiment, where identical or corresponding parts of the system are identified by the same reference numbers. In particular.

DETAILED DESCRIPTION OF PREFERRED EMBODIMENTS

Figure 1:
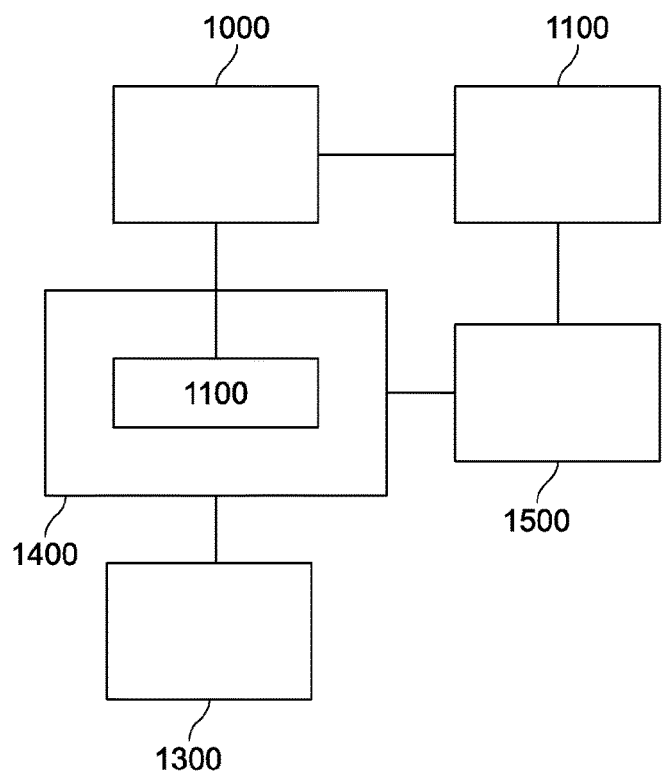
FIG. 1 is a schematic view of an embodiment of the invention.

FIG. 1 illustrates a schematic view of an embodiment of the invention.

Schematically, a user 1000 generates a graphic code 1100. In some embodiments, the code can be generated through a specific software or App that the user 1000 can download. As it will be better explained below, through the graphic code 1100 only the user 1000, or the person having the code, can access the stored information using the graphic code 1100 as a key.

In particular, as it will be better described below, using the graphic code to create an account on an online platform, also the same platform through which the graphic code 1110 has been generated, the user 1000 associates the graphic code to said account. In FIG. 1 the online platform is schematically represented by the block 1500. The account can be created at the same time as the graphic code 1100 is created, or after the graphic code has been created. For example, in some cases the user 1000 can create the code by simply typing his/her email, to which a link will be sent for creating the associated account.

Briefly, a photographer 1300 creates a multimedia content, for example a picture or a video, containing the graphic code 1100. To this end, the user 1300 shall make the graphic code 1100 visible, for example by printing it on an adhesive then glued on the bib, on a bike in case of bike competition, on a motorcycle in case of motorcycle racing, or, generally speaking, by making a print of the graphic code 1100 that is then visible when the user is photographed.

The multimedia content 1400 can then be stored, or, generally speaking, made accessible by third parties, through a storing device 1500. In particular, through the optical recognizing of the graphic code 1100 that will be described below, the multimedia content 1400 is stored in the storing device 1500, associating it with the value of the graphic code 1100, or to the graphic code 1100 non decoded and/or translated in any representation thereof. In this way, the multimedia content 1400 is associated with the graphic code 1100. In this way, only the user who had generated the graphic code 1100 and actuated the account on the online platform, can access the multimedia content 1400 associated with the graphic code 1100. In this way, the multimedia content 1400 is advantageously accessible only by the user 1000, or by a user's representative, avoiding to violate the privacy rights of the user 1000.

Moreover, the photographer 1300 can advantageously make the multimedia content 1400 shareable for purchase purpose, without the need to know the identity of the user 1000 he/she has photographed. This not only allows to protect the privacy rights of the user 1000 and of the photographer 1300, but makes also possible to share pictures in a simple way, without greater workload for the photographer 1300.

Figure 2:
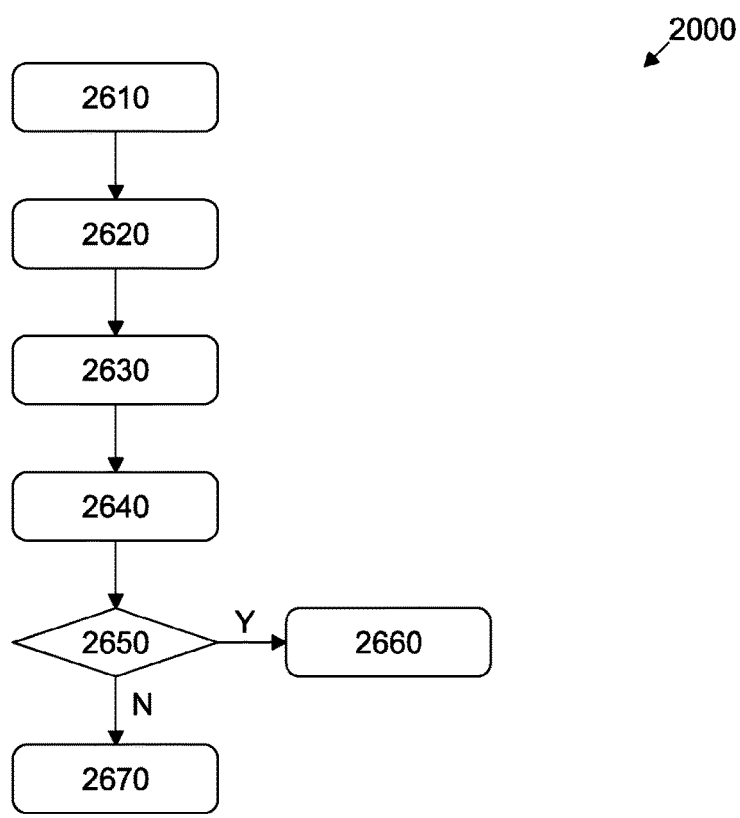
FIG. 2 is a schematic flow diagram of a method according to an embodiment of the invention.

FIG. 2 is a schematic flow diagram of a method according to an embodiment of the invention.

In particular, the graphic code 1100 is created at the step 2610. In general, any type of graphic code may be used, for example an ArUco code, Artoolkit, April tags, QR code and, generally speaking, any graphic code that can be interpreted by means of a recognizing algorithm.

In step 2620, that may be performed in some cases at the same time as the step 2610 and, in other cases, after it, an account is created, associated with the graphic code 1100. In some advantageous embodiments of the invention that will be described below, the association account/code requires the use of a secret key, so as to prevent people not having the secret key from accessing the account associated with the graphic code 1100. As it is clearly apparent, in some embodiments of the invention the step 2620 can be performed after the steps 2630 and/or 2640. The graphic code 1100, that has been applied by the user 1000 in a visible manner as described above, is photographed and/or filmed by the photographer 1300 and is therefore visible in the multimedia content 1400. In step 2630, the photographer 1300 stores the multimedia content 1400 in the storing device 1500. The storing device 1500 can be also accessed by the user. 1000 who wants to see the multimedia content 1400 showing him/her.

In step 2640, the graphic code 1100 is recognized by means of known recognizing techniques or in the way that will be described below with reference to an advantageous embodiment of the invention.

In step 2650, the user 1000 enters his/her account associated with the graphic code 1100. If the account is protected by a password, to access it the user must enter the password. In step 2660, the user 1000 is enabled to access the multimedia content 1400. In step 2670, in case the user 1000 does not have the rights to access the account, the access is denied.

At this point, the procedure can start again from step 2610 in case a new activity begins for which the user 1000 wants to receive multimedia content 1400, from step 2630 in case the photographer 1300 has more than one multimedia content 1400 to upload, or from step 2650 in case the user 1000 has entered a wrong password and wants to try again. As described above, the graphic code 1100 may be any known graphic code. In general, the graphic code 1100 comprises a first image, rectangular or preferably square in shape, representing a numerical value according to a given convention. Various embodiments of this type of graphic coding are known. In some specific embodiments of the invention, the use of an ArUco code has proven to be particularly advantageous. This is due to the fact that the ArUco code can be easily interpreted graphically, as it is a quiet simple code, even if it allows, at the same time, a high number of different codes, maximum 1024, therefore sufficient to identify a high number of users 1000 during a single event.

Figure 3:
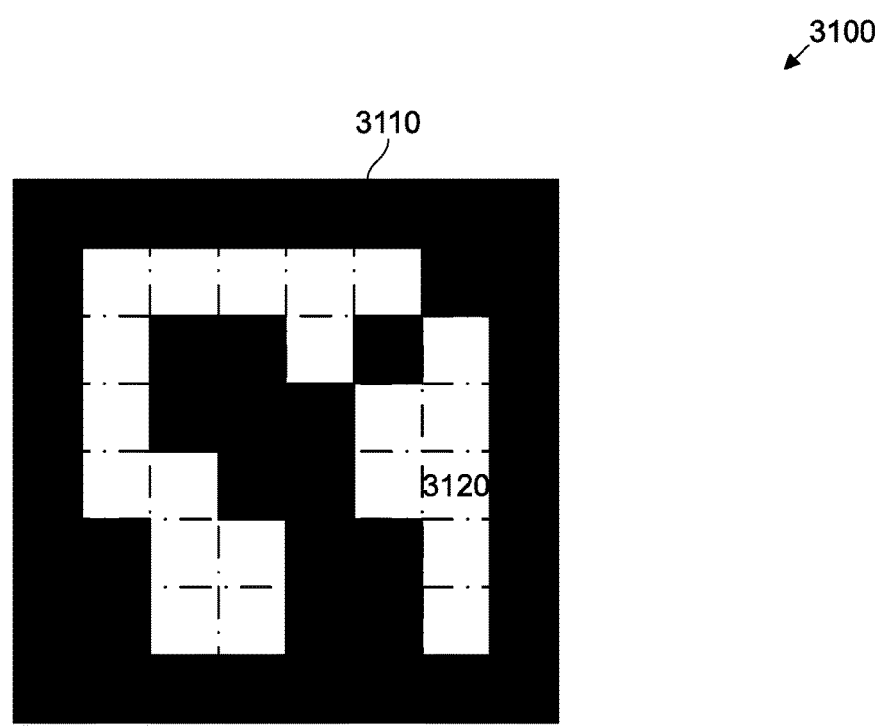
FIG. 3 schematically illustrates an example of single graphic code.

FIG. 3 schematically shows an example of graphic code 3100 of the ArUco type. The graphic code 3100 has a square edge 3110 inside which there is a matrix of N×N squares 3120, in this case 6×6, schematically illustrated with broken lines that are obviously not present in the practical embodiment of the code but are added here in the drawing for the sake of clarity. By differently coloring, with light or dark colors, the squares 3120, according to the ArUco algorithm or the like, it is possible to realize X different embodiments of the graphic code 3100.

The ArUco code is significantly more recognizable and interpretable than other codes, like the QR code, especially in complex images where the code constitutes only a small part of the whole image. Thanks to this feature, the ArUco code can be advantageously used in the case of the multimedia content 1400 described above where the code constitutes only a small part of the whole image taken by the photographer.

However, the ArUco code represents only up to a maximum of 1024 possible combinations. In some cases, this could be not enough, i.e. there could be not enough codes for all the users 1000 of a given competition/event.

Figure 4:
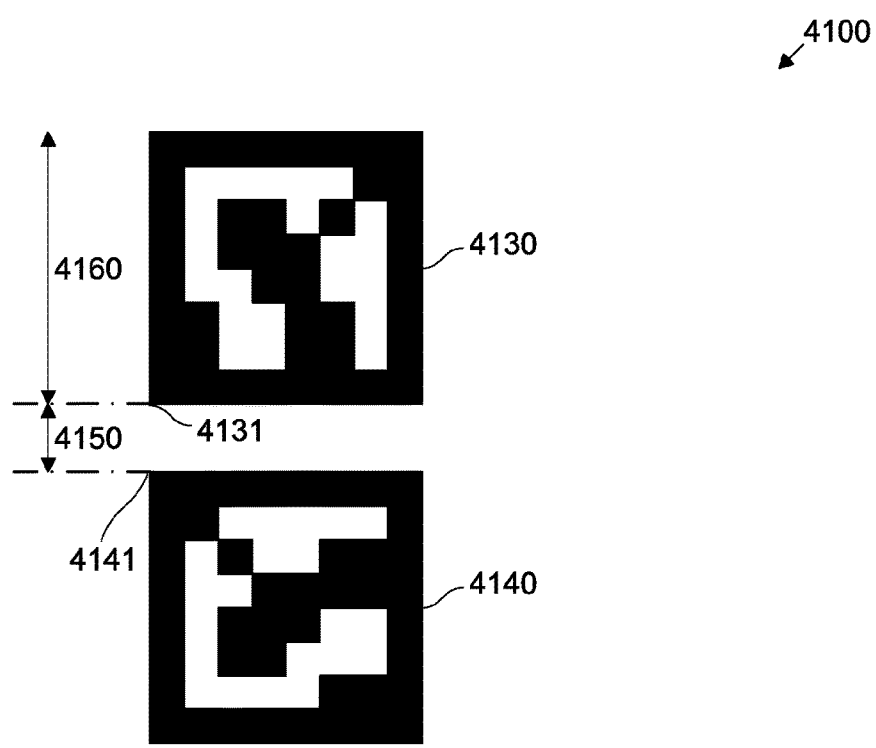
FIG. 4 schematically illustrates an example of multiple graphic code.

To solve this problem, the inventors have developed a new code 4100 based on the combination of at least two ArUco codes, or any other graphic code, as shown in FIG. 4. In particular, FIG. 4 schematically shows an example of a graphic code 4100 related to an embodiment of the present invention. As shown, the graphic code 4100 comprises a first code 4130, rectangular and preferably substantially square in shape, representing a numerical value according to a given convention, and a second code 9140, rectangular and preferably substantially square in shape, representing a numerical value according to a given convention. In some embodiments of the invention, both the first code 4130 and the second code 4140 are ArUco codes. More in general, any type of coding can be implemented, if necessary a different coding for each of the graphic codes 4130 and 4140.

Moreover, the relative position of the codes 4130 and 4140 with respect to each other allows to identify, without doubt, the pivot points 4131, 4141 of the two codes. For example, the two pivot points 4131, 4141 correspond respectively to the lower left angle of the code 4130 and to the upper right angle of the code 4140. Anyway, it is clearly apparent that other combinations of the pivot points 4131, 4141 can be implemented.

Moreover, the presence of the two codes 4130 and 4140 allows significantly to increase the number of codes 4100. In particular, if the first code 4130 allows uniquely to code X elements and the second code 4140 allows uniquely to code Y elements, the combination thereof will allow to code X×Y elements. In the specific implementation case where both the first code 4130 and the second code 4140 are ArUco codes 3100, each of which with 1024 combinations, the total number of combinations will be 1024×1024. However, in some embodiments it is preferable that one of the two codes 4130, 4140 represents a number of codes comprised between 0 and 511, and the other code represents a number of code comprised between 512 and 1023. In this way it is possible to avoid the repetition of codes, for example the code 112-112, that could occur in case all the 1024 codes are used for the first and the second code 4130, 4140.

Moreover, in some embodiments the system can be made more robust by limiting the number of codes, i.e. 1-511 for a code between 4130 and 4140 and 512-1022 for the other code. In particular, in these embodiments, by eliminating the values 0 and 1023 the recognition of the code 4100 is easier, as the values 0 and 1023 coded with the ArUco system correspond to geometrical images that are often present in pictures, such as pure squares and squares with a line inscribed therein.

It is possible that, in some cases, more people are represented in the same multimedia content 1400. In this case, there will be a plurality of codes 4130, 4140, which can lead to an incorrect determination of the code 4100. To avoid this, in some embodiments the first code 4130 and the second code 4140 are positioned at a given distance 4150 from each other. In this way, in the recognizing step 2640, if the distance 4150 is lower than a given threshold, the first code 4130 and the second code 4140 are considered to belong to a single graphic code 4100.

The given threshold 4150 can be defined as a fixed measure, for example 1 cm, 5 cm, or other. In some advantageous embodiments, the given threshold is advantageously obtained by multiplying, by a given value, the dimension 4160 of a given side of the first graphic code 4130 or of the second graphic code 4140. For example, the given side may be the vertical side of the code 4130, or the side having the same orientation as the distance 4150, and the given value may be 0.5 or 0.1. This solution is particularly advantageous; in fact, the choice of the vertical side 4160 as comparison element for the vertical distance 4150 is more tolerant towards optical distortions than a comparison between a horizontal side and the vertical dimension 4150.

In a specific embodiment of the invention, the recognizing step 2640 of the first graphic code 1100, 3100, 4100 comprises a step of decoding the first graphic code 1100, 3100, 4100. Decoding essentially corresponds to the reverse of the logical operation done in the creation step 2610. Moreover, in specific embodiments, the decoding step may be preceded by a step of applying a black and white filter, and/or of applying an adaptable level filter, and/or of recognizing contours and/or of recognizing polygons. Moreover, in specific embodiments, the decoding step may be followed by a step of correcting mistakes. In some embodiments, the decoding step comprises:

1) converting the image containing the code 3100, and/or 4100, and/or 4130, and/or 4140 into black and white;

2) applying an adaptive threshold filter;
3) tracking the contours and recognizing polygons, perspective correction and, lastly, decoding the codes 1100, 3100, 4130, 4140nwith mistakes correction.

Adaptative thresholding is useful for images of reduced dimension to be very fast. It is based on a probabilities calculation with Gaussian average.

This system allows a relatively good speed in image processing, which is useful in case of processing of videos in real time, but it can be poorly satisfactory in terms of recognition of more codes in the same image, above all if the codes are in different light conditions.

The inventors have therefore found that, in case of pictures or videos not in real time for the multimedia content 1400, as it is possible to process single frames in step 2640, it is advantageous to possibly limit the performances in terms of image processing time, but apply a fixed values global threshold algorithm on the entire range of possible values, for example, 256 values, in an interval from 0 to 255, with 1-unit increases.

Therefore, in some embodiments, in the recognizing step 2640, after having converted the multimedia content 1400 into grayscale, N lines are instanced, wherein N can be equal to the number of possible values described above, for example 256. In other words, a version of the processed image is created for each of the 256 values with a fixed incremental threshold algorithm.

For each line a procedure can be then applied for recognizing the graphic codes, resulting in each line identifying a subset of all the graphic codes present in the image.

At the end of the process, all the graphic codes recognized by each recognizing line can be joined. In particular, the known data for each graphic code can be the represented numerical value and/or the four points identifying the angles thereof, with the applied image perspective distortion.

In the system using the code 4100, for each detected code 4130 it will be possible to inspect all the 4140 detected pictures. In the embodiments where the codes 4130 and 4140 have different numerical values, as described above, it will be simple to recognize which codes are of the type 4130 and which codes are of the type 4140. As each ArUco code has a fixed orientation, it is possible to define a pivot point for each code, corresponding, for instance, to an angle.

By applying an algorithm calculating the geometrical distance, if necessary with perspective adjustment, between the pivot point 4131 of the code 4130 taken into account, and the pivot points 4141 of the codes 4140 detected in the same image, it will be possible to define the distance between each pair of pivot points 4131, 4141, and therefore the distance 4150 for each pair of codes 4130, 4140. In case the pivot points 4131, 4141 are predefined, for example, as the bottom left angle of the code 4130 and the top left angle of the code 4140, the distance between the pivot points will correspond to the distance 4150. Once the distance 4150 has been determined for each detected code 4140, with respect to the code 4130 taken into account, with a simple inequality it will be possible to compare this distance with a given distance, for example the dimension of a side of a single code 4130, 4140. If the distance 4150 is lower than the given distance, this means that the codes 4130 and 4140 can be coupled. This pair constitutes the value of the code 4100. In view of the above description, according to the present invention the graphic code cannot be referred to the person carrying it. Therefore, this code represent a way to distinguish pictures or other digitalized information associated with the user, without the need for knowing the user's personal data.

Therefore, according to the invention, in case of a sport competition it is not necessary to pre-associate the athlete with the graphic code assigned to him/her. The graphic code is connected to an account that can be defined "ghost account", as it is not correlated to the identification data of the athlete. When the code is inserted in the program, the "ghost" account is associated with the digital information correlated to the code user, and it is therefore possible to access pictures where the code is present.

Therefore, each athlete to whom a code has been associated can access his/her pictures without the need of entering his/her personal data or bib number in the system, and it is not necessary that each code is given to a given user based on a "rule".

Supposing of having a box containing thousands of adhesive, i.e. thousands of codes, it is sufficient to take one adhesive at random and to give it to any user taking part in the competition/event. Each person can access the pictures taken during the competition/event and correlated to the adhesive he/she has received by simply inserting the code printed on the adhesive, without the need for using his/her own personal data, therefore without the need for communicating his/her personal data to the system's users, nor to the system itself.

Even if the present invention has been described with reference to a specific embodiment and the attached drawing, it is clearly understood that the invention is not limited to this specific embodiment and the attached drawing. In particular, various elements of the various embodiments described or illustrated in this document can be combined together so as to have further embodiments of the invention. More specifically, it will not be necessary to combine all the elements described with reference to a first embodiment with all the elements described with reference to a second embodiment, but it will be possible to combine only some elements of the first embodiment with only some elements of the second embodiment. More in general, any combination of one or more elements of one or more embodiments described and/or illustrated can result in a further embodiment of the present invention, as defined by the attached claims.

REFERENCE NUMBERS

1000: user
1100: graphic code
1300: photographer
1400: multimedia content
1500: storing device
2610: creating a graphic code
2620: creating an account
2630: storing a multimedia content
2640: recognizing a graphic code
2650: accessing the account
2660: accessing the multimedia content
2670: denied access to the multimedia content
3100: graphic code
3110: edge
3120: squares
4100: graphic code
4130: graphic code
4131: pivot point
4140: graphic code
4141: pivot point
4150: distance
4160: side

The invention claimed is:

1. A method to access a multimedia content, comprising the steps of:
   creating first and second graphic codes, each graphic code representing a numerical value, wherein the first graphic code is disposed vertically above the second graphic code,
   creating an account associated with the first and second graphic codes,
   recognizing the first and second graphic codes in the multimedia content, and
   allowing a user enabled to access said account, to access the multimedia content comprising the first and second graphic codes,
   wherein the first graphic code and the second graphic code are spaced from each other by a given distance in a vertical direction, and wherein, if the given distance is lower than a given threshold that is determined as a ratio of a length of a vertical dimension of at least one of the first and second graphic codes, in the recognizing step, the first graphic code and the second graphic code are considered to belong to a single graphic code.

2. The method according to claim 1, wherein the multimedia content is an image or a video.

3. The method according to claim 1, wherein the first graphic code and/or the second graphic code are ArUco codes.

4. The method according to claim 1, wherein the given threshold is obtained by multiplying, by a given value, the vertical dimension of a given side of the first graphic code or of the second graphic code.

5. The method according to claim 1, wherein the given distance is calculated based on the distance between a pivot point of the first graphic code and a pivot point of the second graphic code.

6. The method according to claim 1, wherein the orientation of the first graphic code and/or of the second graphic code is determined by the position of the first graphic code with respect to the second graphic code.

7. The method according to claim 1, wherein the recognizing step of the first and second graphic codes comprises a step of decoding the first and second graphic codes, wherein the decoding step may be preceded by a step of:
   applying a black and white filter, and/or
   applying an adaptable level filter, and/or recognizing contours, and/or recognizing polygons,
   wherein the decoding step may be followed by a step of: correcting mistakes.

8. The method according to claim 1, wherein each of the first graphic code and the second graphic code has a rectangular shape.

9. The method according to claim 1, wherein each of the first graphic code and the second graphic code has a square shape.

10. A method to access a multimedia content, comprising the steps of:
    creating first and second graphic codes, each graphic code representing a numerical value, wherein the first graphic code is disposed vertically above the second graphic code;
    creating an account associated with the first and second graphic codes,
    recognizing the first and second graphic codes in the multimedia content,
    storing the multimedia content in association with the account; and
    providing access to the stored multimedia content through the account associated with the first and second graphic codes;
    wherein the first graphic code and the second graphic code are spaced from each other by a given distance in a vertical direction, and wherein, if the given distance is lower than a given threshold that is determined as a ratio of a length of a vertical dimension of at least one of the first and second graphic codes, in the recognizing step the first graphic code and the second graphic code are considered to belong to a single graphic code.

* * * * *